June 21, 1938.  O. E. LEINES  2,121,705
TRAILER HITCH
Filed Nov. 16, 1937   2 Sheets-Sheet 1

Otto E. Leines, INVENTOR
BY Victor J. Evans & Co.
ATTORNEYS

June 21, 1938.        O. E. LEINES        2,121,705
TRAILER HITCH
Filed Nov. 16, 1937        2 Sheets-Sheet 2
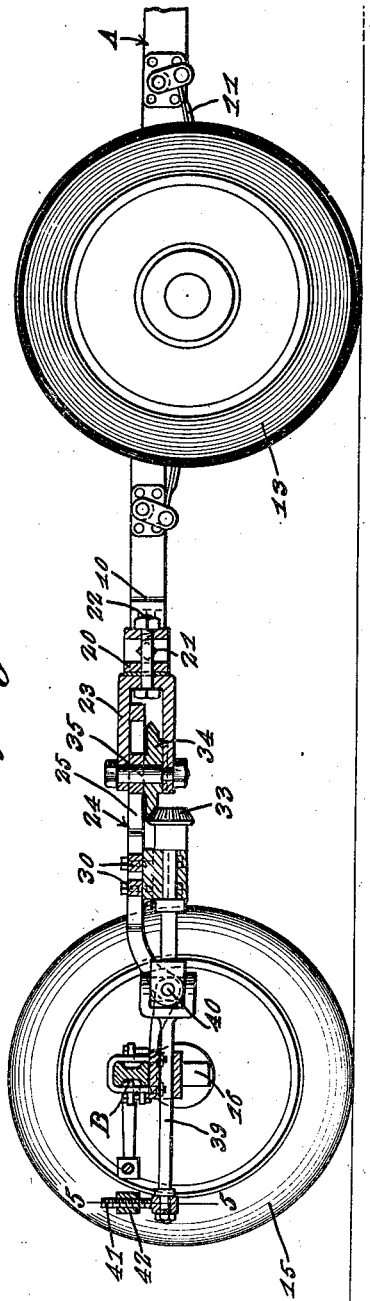
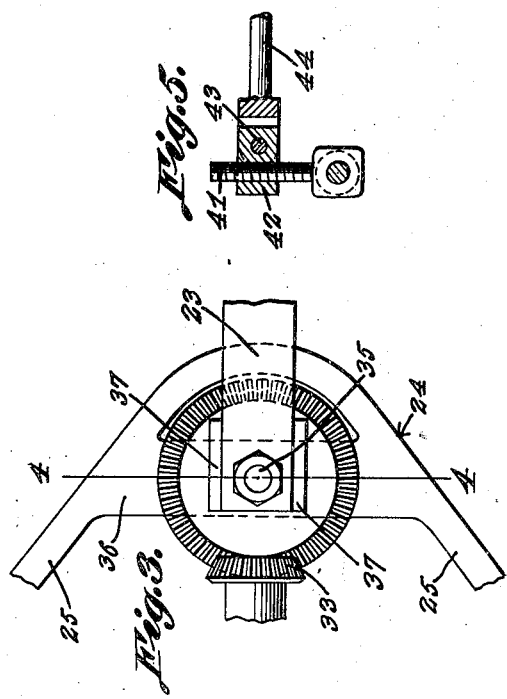
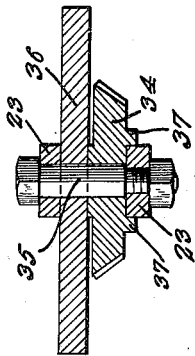
Otto E. Leines, INVENTOR
BY Victor J. Evans & Co.
ATTORNEYS Patented June 21, 1938

2,121,705

UNITED STATES PATENT OFFICE 2,121,705

TRAILER HITCH

Otto Emil Leines, Moose Jaw, Saskatchewan, Canada

Application November 16, 1937, Serial No. 174,887

2 Claims. (Cl. 280—33.55)

The invention relates to vehicular steering mechanism and more particularly to trailer hitches for trailer vehicles.

The primary object of the invention is the provision of a hitch of this character, wherein the trailer vehicle will be automatically steered so as to follow the towing vehicle and overcomes the sway now prevalent in trailers, the hitch being of novel construction and assures steady conditions to the trailing vehicle in the use thereof.

Another object of the invention is the provision of a hitch of this character, wherein the construction thereof is novel in its entirety and assures the positive steering or guiding of the trailing vehicle when being towed following directly the trend of the forward or towing vehicle.

A further object of the invention is the provision of a hitch of this character, which is simple in its construction, thoroughly reliable and effective in operation, readily and easily applied, automatic in the working thereof, strong, durable, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 2 is a sectional view taken on the line 2—2 of Figure 1 looking in the direction of the arrows.

Figure 3 is an enlarged fragmentary bottom plan view of adjuncts of the hitch.

Figure 4 is a sectional view on the line 4—4 of Figure 3.

Figure 5 is a sectional view on the line 5—5 of Figure 2.

Similar reference characters indicate corresponding parts throughout the several views in the drawings.

Figure 1:
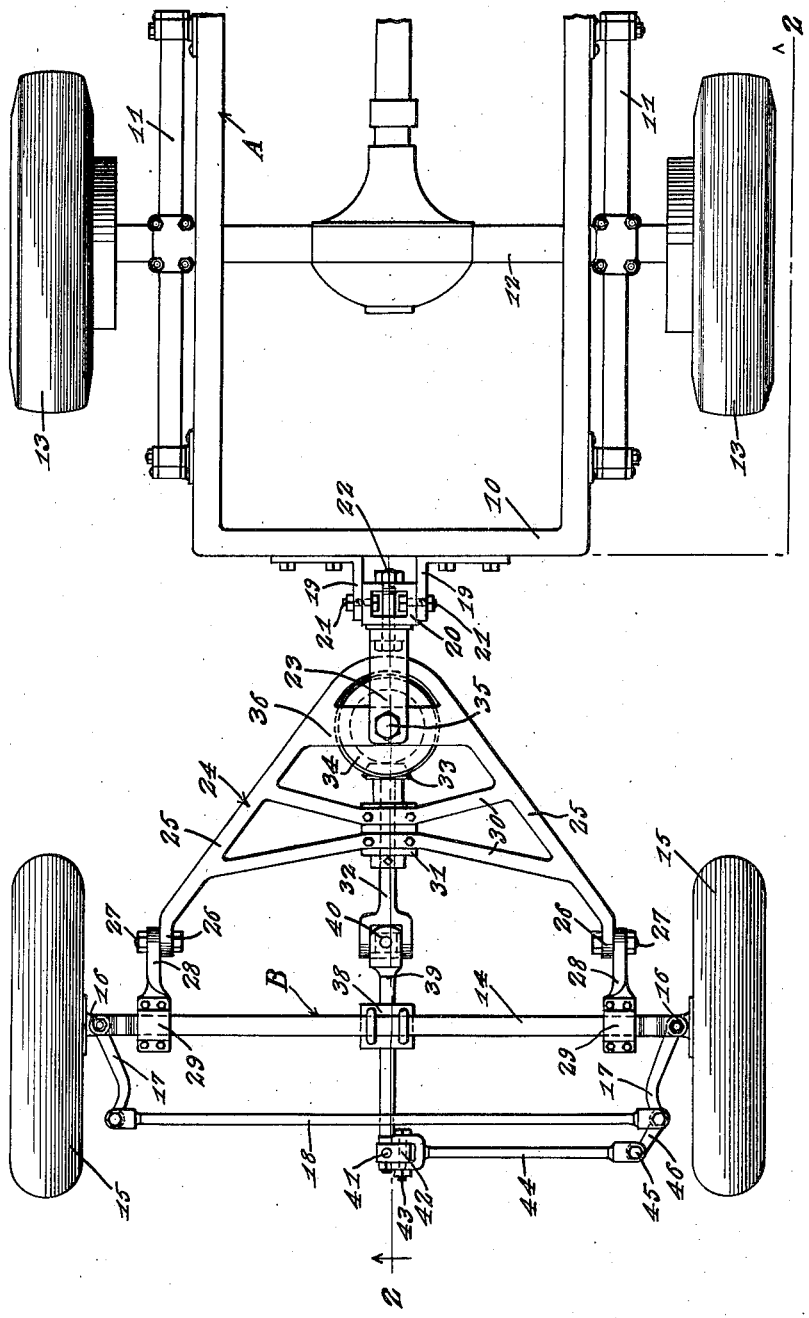
Figure 1 is a top plan view showing a portion of the towing vehicle and a trailer with the hitch constructed in accordance with the invention applied.

Referring to the drawings in detail, A designates generally a portion of a towing vehicle and B a portion of the trailer or drawn vehicle, respectively. The towing vehicle as usual involves a chassis, a portion being indicated at 10, having in association the rear springs 11, rear axle housing 12 and rear driving or traction wheels 13, respectively. The trailer or drawn vehicle involves a front axle beam 14 having in association the front steering wheels 15, these being turned through the medium of turning knuckles 16, their turning arms 17 are pivotally joined with a steering tie rod 18 for a unity of action with each other.

Secured to the rear end of the chassis 10 at the longitudinal center of the latter is a bracket including a pair of spaced L irons 19 by and between which is swingingly supported for vertical movement a coupling box 20, being pivoted at 21 for vertical swinging movement while swiveled centrally to this box at 22 is a substantially U-shaped draft yoke 23 adapted for lateral rocking or swinging movement while carried into the said yoke is a substantially V-shaped draw frame 24, its side arms 25 being formed with eye terminals 26 accommodating pivots 27 which are received in pivot ears 28 of a pair of axle clips 29, these being clamped to the axle 14 of the trailer or drawn vehicle B, preferably close to the turning knuckles 16.

The frame 24 has formed therewith at its arms 25 cross braces 30 to which is fastened a shaft bearing 31 accommodating a rotatable shaft 32 provided with a pinion 33 meshing with a gear 34 having its center arbor 35 fixed in the yoke 23 and also passed through a cross web 36 formed in the frame 24. The gear 34 has provided on one face thereof locking ribs 37 engageable with one side of the yoke 23 so that on the angular throw from the line of draft of the said yoke 23 by the towing vehicle A the gear 34 is caused to turn or rotate and through the pinion 33 the shaft 32 simultaneously rotates therewith.

Fixed to the axle 14 of the trailer or drawn vehicle B centrally thereof is a shaft bearing 38 in which is journaled a rotatable shaft 39 having universal joint connection 40 with the shaft 32 forwardly with the axle 14 while rearwardly of the said axle and fixed to the shaft 39 is a throw stem 41 having threaded thereon for adjustment a link 42 pivotally connected at 43 to a drag link 44, which is also pivoted at 45 to an extension 46 of one arm 17 of a turn knuckle 16.

When the tow vehicle A diverts from a straight line of draft or makes a turn through the hitch before described, the trailer or drawn vehicle B will be automatically steered following the direction of travel of the tow vehicle and in this manner the trailer is prevented from sway and assured of steadiness and automatic steering, being required to follow the direction of travel of the towing vehicle and stability of the trailer is had.

It is to be understood that a suitable dust cup (not shown) can be applied to the draft yoke 23 so that dust will be excluded in the working of such yoke and also the gearing 33 and 34 can be protected by a suitable housing or dustproof cover. Furthermore, a grease cup (not shown) can be associated with the hitch for the deposit of grease at the point where the two gears 33 and 34 mesh.

What is claimed is:

1. A hitch for tow and trailer vehicles, the former having a chassis frame and the latter having a front axle, steering wheels and turning knuckle connections between the same comprising a coupling box vertically swingable on the chassis frame, a draft yoke swiveled in said coupling box, a gear having a seat for accommodating a portion of said yoke and holding the gear fixed within the latter, a draft frame attached for vertical swinging movement to the front axle and received in said yoke above said gear, a pin engaging the yoke, draft frame and gear and swingingly connecting the said draft frame and yoke with each other, a tie rod pivotally connecting the turning knuckles, a drag link associated with one of said knuckles, driven connections between the gear and the drag link and supported by said draft frame and front axle, respectively, and having a pinion meshing with said gear, and a universal joint between the said draft frame and the front axle.

2. A hitch for tow and trailer vehicles, the former having a chassis frame and the latter having a front axle, steering wheels and turning knuckle connections between the same comprising a coupling box vertically swingable on the chassis frame, a draft yoke swiveled in said coupling box, a gear having a seat for accommodating a portion of said yoke and holding the gear fixed within the latter, a draft frame attached for vertical swinging movement to the front axle and received in said yoke above said gear, a pin engaging the yoke, draft frame and gear and swingingly connecting the said draft frame and yoke with each other, a tie rod pivotally connecting the turning knuckles, a drag link associated with one of said knuckles, driven connections between the gear and the drag link and supported by said draft frame and front axle, respectively, and having a pinion meshing with said gear, a universal joint between the said draft frame and the front axle, a throw stem associated with said connections, and a link adjustably fitting the said stem and pivoted to the drag link.

OTTO E. LEINES.